United States Patent [19]

Hall et al.

[11] 3,731,363

[45] May 8, 1973

[54] PRINTED CIRCUIT BOARD MANUAL ASSEMBLY DIRECTOR DEVICE

[75] Inventors: Richard L. Hall, Baltimore; Carl F. Miller, Crofton, both of Md.

[73] Assignee: Westinghouse Electric Corporation, Pittsburgh, Pa.

[22] Filed: Mar. 11, 1971

[21] Appl. No.: 123,257

[52] U.S. Cl. ....................29/203 B, 29/626, 340/380, 250/227

[51] Int. Cl. ............................................H01r 43/04

[58] Field of Search ..................340/380, 381; 35/13; 29/33, 407, 428, 429, 592, 203 R, 203 B, 203 J, 203 MW, 203 P, 203 S, 624, 625, 626; 250/227

[56] References Cited

UNITED STATES PATENTS

| | | | |
|---|---|---|---|
| 3,548,493 | 12/1970 | Hubbard | 29/203 B |
| 3,169,305 | 2/1965 | Gray | 340/380 X |
| 3,585,396 | 6/1971 | Ferguson et al. | 250/227 |
| 3,372,455 | 3/1968 | Howie | 29/407 X |
| 3,391,473 | 7/1968 | Hays, Jr. | 29/407 X |
| 3,391,474 | 7/1968 | Hays, Jr. | 29/407 X |
| 3,516,155 | 6/1970 | Smith | 29/407 X |

*Primary Examiner*—John W. Caldwell
*Assistant Examiner*—William M. Wannisky
*Attorney*—F. H. Henson, E. P. Klipfel and D. F. Straitiff

[57] ABSTRACT

A printed circuit board manual assembly director device including: a compartmented rotary component tray having selectively accessible radial and circumferential compartments; drop-in modules each containing a system of light pipes and having a readout panel with component-lead-accommodating through holes for registry with the lead holes of a particular printed circuit board, and adjacent director-light through holes into which output ends of the light pipes extend; and, an illumination control system for the input ends of the module's light pipes to control their illumination selectively in accord with component tray compartment accessibility.

5 Claims, 4 Drawing Figures

PRINTED CIRCUIT BOARD MANUAL ASSEMBLY DIRECTOR DEVICE

BACKGROUND OF THE INVENTION

1. Field of the Invention

This invention relates to a printed circuit board manual assembly director device of the type which employs a horizontal compartmented rotary component tray and a system of light pipes illuminated selectively according to tray position to create light spots on the printed circuit board to indicate lead insertion locations for the circuit components accessible to the assembler in the different rotary tray positions.

2. Description of the Prior Art

In a previous director device of the above type the rotary component tray is divided by radially extending partitions into such as twenty-four circumferential compartments which may be advanced sequentially into an accessability position in front of the assembler, thus, the maximum number of different components available for assembly in such device is limited to the number of radially partitioned circumferential tray compartments. Such previous director device also employs plug-in connection of the light pipes with a tray-position-controlled light source at one end. To change such light pipe connections to suit a new printed circuit board layout is a tedious and time-consuming operation involving tie-up of such director device. In addition, such previous director device arranged the light-spot assembly-directing ends of the light pipes on a readout panel to shine through the lead holes of the printed circuit board placed on such readout panel for component assembly. This arrangement limits the depth to which the component leads can be inserted downwardly through the printed circuit board lead holes before becoming blocked by the ends of the light pipes on the underlying readout panel, and necessitates use of components with pre-clipped, relatively short leads. This creates difficulty in inserting such leads in the lead holes, since the components themselves tend to obstruct view of the leads during insertion into the lead holes beneath.

SUMMARY OF THE INVENTION

The present invention, in providing circumferentially-extending partitions in addition to the radially extending partitions in the rotary component tray, each circumferentially separated tray compartment is divided into two radially separated compartments to double the component-number capacity of such rotary tray, from 24 to 48, for example. A shutter means is employed to selectively block the fore and aft tray sections and to effect correlation of light pipe illumination control with selection of such radial tray section selection.

The present invention, by illumination of individual mechanical connection of the light pipes to the light source within the device and substitution of an optically-coupled drop-in module which includes pre-arranged light pipes connected to a readout board, different assembly programs for different printed circuit boards can be changed readily without tying up use of the device.

Still further, the present invention, by using light-spot holes in the readout panel that are out of registry with the lead-accommodating holes, the component leads are afforded freedom for full-length insertion into the printed circuit board lead holes, which greatly facilitates such insertion. Clipping of the component leads is deferred until after all components have been assembled on the printed circuit board, after which all leads are sheared in unison by a tool (not shown) provided for such purpose.

DESCRIPTION OF THE PREFERRED EMBODIMENTS

Figure 1:
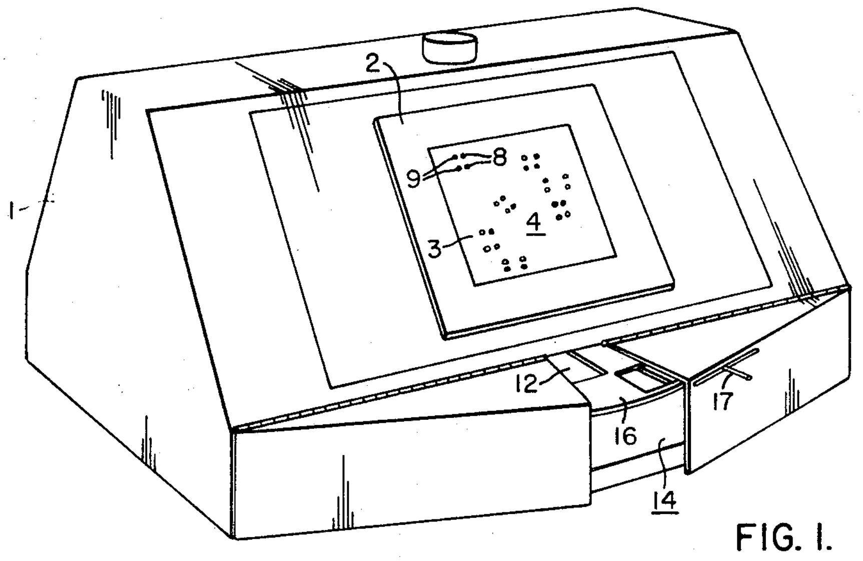
FIG. 1 is a perspective view of a printed circuit board manual assembly director device embodying the improvements of the present invention.
Figure 2:
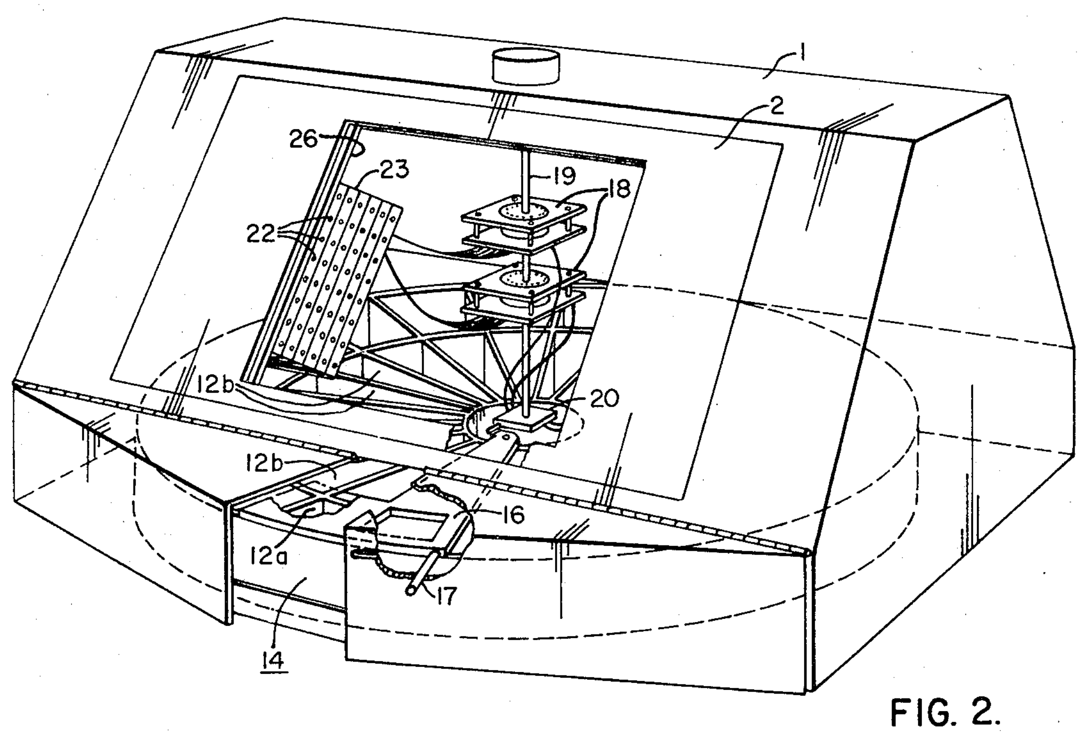
FIG. 2 is a front perspective view of the device of FIG. 1 with a drop-in director module of the present invention removed to reveal details of internal construction.
Figure 3:
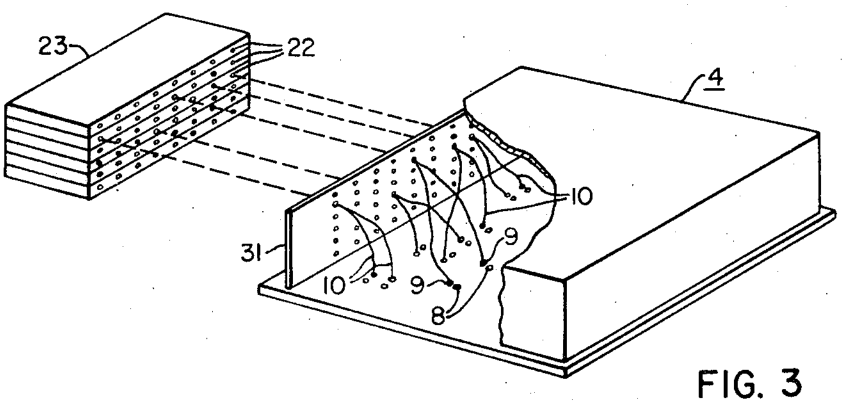
FIG. 3, is a perspective view of the drop-in director module of the present invention in inverted position and partially cut away to reveal details of internal construction.
Figure 4:
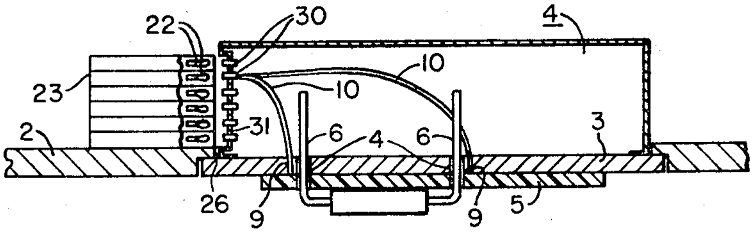
FIG. 4 is a cross-sectional view of the drop-in director module of the present invention in working position, insertion-mounted in an opening in the front cover panel of the device, in light-coupled registry with an interior lamp array, with a printed circuit board in place on the readout panel of such module, and with a typical component in lead-inserted position on such board.

Referring to the drawings, the improved printed circuit board manual assembly director device of the present invention is of the type intended for use on a work bench or table (not shown) and includes a housing 1, FIG. 1, having a sloping front cover panel 2 in the center of which is flush mounted a readout panel 3 of a drop-in assembly director module 4 that accepts a particular printed circuit board 5 (FIG. 4) to direct insertion of leads 6 of circuit components, such as resistor 7 (FIG. 4), through lead holes 8 in printed circuit board 5 and corresponding registering holes 8 in read-out panel 3. As directed to the assembler or operator by light spots transmitted by light pipes 10 to holes 9 disposed adjacent to the lead holes 8 through which such leads 6 are to be inserted, which light spots are viewed by the operator through the printed circuit board which will be composed of translucent if not transparent material.

The components to be lead-insert positioned sequentially on the p.c. board 5 as prompted by sequential lightpipe illumination of different sets of readout holes 9 in the readout panel 3 are located in radially and circumferentially separated storage compartments 12 in a horizontal rotary tray 14 within housing 1 which is turned step-by-step to bring such compartments into open-top registry with a component-access port in the center of a forwardly extending portion of the housing 1. A shutter member 16 is so constructed and arranged to be positioned by such as a tab 17 to selectively cover either the forward or the rearward portion of the component access port in the housing for exposure of either the forward radial compartment 12*a* or the rearward radial compartment 12*b* of each of the circumferential tray compartments which are advanced manually one-by-one by turning the tray 14.

To control illumination of the readout holes 9 to suit component tray compartment location, a pair of rotary selector switches 18 operated by a shaft 19 turned in unison with tray 14 are employed. A selector switch 20 controlled by the position of the shutter 16, controls input energization supply to the rotary switches 18 selectively according to exposure of forward or rearward tray compartments 12a and 12b. Each selector switch 18 effects selective energization of a number of small light bulbs 22 in rectangular array in an assembly 23 disposed within housing 1 beneath cover panel 3 adjacent to a side edge of a rectangular opening 26 provided therein for accommodation of plug-in director module 4.

Each tray compartment 12a, 12b has at least one respective light bulb 22 that becomes illuminated when such compartment becomes accessible to the operator via the component access port; at least 48 light bulbs 22 when there are 48 tray compartments, for example.

The drop-in director module 4 is box-shaped, with its readout panel slightly larger than opening 26 to provide a stop position for disposition flush with cover panel 2. The light pipes 10 extend from the holes 9 in readout panel 3 to hollow holder members 30 in one side wall 31 of the module arranged for coincidence with respective ones of the light bulbs 22 to provide illumination of respective holes 9 according to component-insertion requirements of given tray compartments.

Different drop-in assembly director modules 4 can be fabricated and stored for selective use in the device by merely dropping the modules 4 in place to gain optical coupling of the light pipe ends in holder members 30 which thereby come into proper registry with bulbs 22.

In lieu of the array of light bulbs 22 controlled by rotary switches 18, a single bulb might be used in conjunction with a shutter means operated in synchronism with rotary tray shaft 20.

Irrespective of the mode of illumination control, it is preferable to employ monofilament type light pipe elements 10, rather than fiber optic bundles. Using light pipe elements 10 of about three-sixty-fourths of an inch in diameter has been found suitable, and this enables a considerable number of such light pipe elements 10 to be nested in the same holder member 30 to accommodate assembly of a plurality of a particular component from a given tray compartment at a number of different locations on the printed circuit board, two light pipes 10 for the two light-spot holes 9 in the readout panel 3 being used at each dual-lead-hole 8 component location.

What we claim is:

1. An improved printed circuit board manual assembly director device, comprising, a horizontal rotary component-holding tray having component-holding compartments therein for circumferential advancement selectively to a forward compartment-accessability position, a backward sloping front cover panel member disposed above and rearward of said forward compartment-accessability position, said front cover panel member having a director-module-insertion-accommodating opening therein, a fixed-location light source disposed behind said front cover panel, a drop-in assembly director module disposed in an inserted position in the aforesaid opening and constructed and arranged for facile removal and replacement via such opening, said director module including a readout panel normally closing said opening in inserted position of said module and an array of light pipes arranged therein with light-inputs ends disposed for optical coupling with said light source and light-output ends inserted into light-spot director holes opening through said readout panel adjacent to component lead-accommodating holes for registry with a printed circuit board to be placed on said readout panel, and control means controlling selective illumination of the input ends of said light pipes from said light source according to exposure of the rotary tray compartments to operator accessability.

2. The improved printed circuit board manual assembly director device of claim 1, wherein, said compartments in said rotary component-holding tray are separated circumferentially and radially, and said device further includes a shutter member operable to selectively close different radial component tray compartments when disposed in said forward position.

3. The director device of claim 2, wherein, operation of said control means is dictated in accord with rotary position of said tray as well as radial-covering position of said shutter member.

4. The director device of claim 1, wherein, said light pipes are of the monofilament type.

5. The director device of claim 1, wherein, said light source is in the form of an array of light bulbs substantially equal in number to the number of rotary tray compartments, and said control means is in the form of selector switch means controlling selective energization of said bulbs.

* * * * *